United States Patent [19]

Holko

[11] 4,333,671
[45] Jun. 8, 1982

[54] FRICTION WELDED TRANSITION JOINT

[75] Inventor: Kenneth H. Holko, San Diego, Calif.

[73] Assignee: General Atomic Company, San Diego, Calif.

[21] Appl. No.: 146,771

[22] Filed: May 5, 1980

[51] Int. Cl.³ .......................................... F16L 13/02
[52] U.S. Cl. .................................. 285/173; 228/112; 228/175; 285/286; 285/DIG. 6
[58] Field of Search ................ 285/173, 329, DIG. 6, 285/286; 228/112, 263 D, 175

[56] References Cited

U.S. PATENT DOCUMENTS

| | | | |
|---|---|---|---|
| 1,613,461 | 1/1927 | Johnson | 285/173 |
| 2,763,923 | 9/1956 | Webb | 285/286 X |
| 2,769,227 | 11/1956 | Sykes et al. | |
| 2,770,030 | 11/1956 | Carpenter et al. | |
| 3,052,016 | 9/1962 | Zimmer. | |
| 3,123,447 | 3/1964 | Zimmer. | |
| 3,175,284 | 3/1965 | Cotovsky | 285/329 X |
| 3,284,174 | 11/1966 | Zimmer. | |
| 3,425,718 | 2/1969 | Shaw, Jr. | 285/173 |
| 3,662,941 | 5/1972 | Gage | 228/112 X |
| 4,010,965 | 3/1977 | Izuma et al. | 285/173 |

Primary Examiner—Thomas F. Callaghan
Attorney, Agent, or Firm—Fitch, Even, Tabin, Flannery & Welsh

[57] ABSTRACT

A transition joint is disclosed for joining together tubular pieces formed respectively from a low alloy or carbon steel and a high temperature alloy composition having substantially different characteristics such as coefficient of thermal expansion, the transition joint including a plurality of tubular parts interconnected with each other by means of friction weld joints formed at an angle of 90° to the axis of the transition joint, the tubular parts at opposite ends of the transition joint being selected to facilitate in situ welding to the low alloy or carbon steel and high temperature alloy respectively.

3 Claims, 4 Drawing Figures

FRICTION WELDED TRANSITION JOINT

BACKGROUND OF THE INVENTION

The present invention relates to high temperature transition joints and more particularly to such a joint adapted for interconnection between a first tubular piece formed from a low alloy steel or carbon steel and a second tubular piece formed from a high temperature alloy.

In many high temperature applications, it is necessary to join together tubular pieces of substantially different characteristics. For example, such applications arise in boiler construction and nuclear power stations where various heat exchanger components, such as steam generators, intermediate heat exchangers, recuperators, boilers, etc., must withstand severe conditions in high temperature environments. Similar problems arise in other industries. For example, petrochemical equipment and chemical processing plants have similar requirements for heat exchangers, steam lines and the like.

In all of these applications, it is usually necessary to form large numbers of interconnections between materials of substantially different characteristics. Usually, one end of the tubular interconnection is formed from a high temperature alloy particularly suited for withstanding high temperature environments encountered in these applications. At the same time, it is necessary for the interconnection or transition joint to withstand the same severe operating conditions of temperature, etc., over extended periods of time.

Under conditions of the type described above, the different types of materials exhibit substantially different characteristics which make it particularly difficult to maintain continuity throughout the transition joint. The existence of different thermal expansion coefficients on opposite sides of any given joint, produce particularly severe stresses which tend to cause cracking or disruption of the joint. Other factors such as deleterious metallurgical changes also exist within such transition joints which further interfere with the maintaining of an effective transition joint or interconnection.

Substantial effort has been expended in the past to develop effective transition joints for such applications. One such approach has been the formation of the joint with continuously changing chemical composition along the length of the joint, one end of the joint being connected to one tubular piece while the opposite end of the joint is joined to a tubular piece of substantially different composition and characteristics. Many different types of material have also been employed to form such transition joints. Heat treatment has also been employed both prior to and following formation of the transition joint in order to better condition the transition joint for withstanding severe operating conditions of the type referred to above.

However, even with such developments and improvements in the area of transition joints, high failure rates have been experienced with transition joints exposed to high temperature conditions. The owners of heat exchanger equipment commonly find it necessary to replace or repair thousands of such transition joints in a single installation. Accordingly, there has been found to remain a need for improved transition joints, particularly for use as an interconnection between low alloy and carbon steel tube or pipe and high temperature alloy tube or pipe.

In connection with the present invention and as described in greater detail below, the term "low alloy steel" is intended to encompass materials such as ASTM Type T-22 composed of 2¼% chromium, 1% molybdenum, 0.15% carbon, balance essentially steel and other similar low alloy ferritic steels. Carbon steel is intended to encompass iron base alloys where the principal alloying addition is carbon in amounts up to approximately 2%. At the same time, the term "high temperature alloy" is intended to encompass both wrought and cast austenitic steels, stainless steels and nickel base alloys for example.

SUMMARY OF THE INVENTION

It is therefore an object of the invention to provide a transition joint capable of being interconnected between low alloy and carbon steel tubing and high temperature alloy tubing.

It has been found that an improved transition joint may be constructed in accordance with the present invention by forming the transition joint from a plurality of transition parts each of selected composition. Adjacent parts within the transition joint are interconnected with each other by means of friction welding in order to form a friction welded interface between each such pair which is perpendicular to the longitudinal axis of the joint. Additional advantages of friction welding for such an application are described below.

The transition joint is also adapted for in situ interconnection of the joint with suitable tube pieces. For example, the composition of a transition part at one end of the transition joint is selected to facilitate its welding to a low alloy steel tubular piece, for example, by conventional fusion welding. Similarly, a transition part at the other end of the joint is formed from a material selected to facilitate its welding to a high-temperature alloy tubular piece. Here again, for example, the material of this transition part is preferably selected to facilitate its welding to the high temperature alloy tube by fusion welding. Fusion welding may of course be employed in field applications where the transition joints would be interconnected into boiler arrangements or other heat exchangers, or the like. Friction welding on the other hand requires the use of relatively massive machinery which is not particularly suitable for such in situ operations.

The use of friction welding, however, is of critical importance for forming the intermediate interfaces or solid-state welds within the transition joint itself. In this regard, it is noted that friction welding as contemplated by the present invention may include either conventional friction welding operations, inertial welding, radial friction welding and orbital friction welding. In either event, friction welding is an essentially solid state operation where the adjacent ends of two tubes are urged against each other under suitable pressure and driven in relative rotation to produce frictional heating at their interface. When the material of both tubes at the interface becomes plastic with perhaps some material being molten, increased axial pressure or upset force is applied to the tubes in order to extrude all molten and some plastic material radially outwardly from the interface. The forging together of atomically clean, plastic material results in a solid-state weldment between the two tubes.

Friction welding offers two particular advantages which are of critical importance within the present invention. Initially, because of the manner in which the bond is formed between two rotating parts, the resulting bond or interface is necessarily formed perpendicularly to the axis of rotation for the parts. In the case of a transition joint, the axis of rotation, of course, corresponds to the axis of the joint itself. It has been determined by means of stress analysis that such a perpendicular joint is best suited for resisting and withstanding stresses of the type produced by the interaction between the different metallic compositions in such transition joints. The use of friction welding in forming the welds of the transition joint is also important because of the solid state nature of the friction welding operation. As was noted above, molten metal may be produced at the interface of the relatively rotating parts during the friction welding operation. At that time, there may be some mixing or blending between the composition of the two transition parts. However, upon the final application of upset pressure, that molten or blended material is extruded from the interface outwardly so that a final perpendicular bond is formed with the composition of each transition part being substantially unchanged on either side of the bond. This avoids the development of uneven stresses produced along the joint as might arise, for example, during fusion welding where different compositions would result from variations in the amount of blending about the circumference of the tubular joint. The different compositions will have different physical and mechanical properties.

As will be made more apparent in the specific examples described below, varying numbers of transition parts may be included in each transition joint depending in particular upon the application in which the transition joint is to be employed. For example, if the transition joint is to be exposed to extremely high temperatures, a greater number of transition parts may be employed within the joint as compared, for example, to a transition joint to be employed at only moderately high temperatures. Similarly, the number of parts employed within each transition joint may also be adjusted depending upon the mechanical strength to be developed and maintained throughout the joint and also depending upon other stresses to which the joint may be subjected. Each of the parts within the joint may be selected to have an intermediate composition facilitating or adapting it for interconnection or bonding at its opposite ends with tubular parts having compositions of greater variation. As will be apparent from the following examples, the sequence of parts throughout each transition joint may be selected to produce a variation in chemical composition, thermal expansion, and mechanical properties, for example.

The use of friction welding is further desirable in the formation of such transition joints since it tends to eliminate or decrease dependence upon heat treatment, either prior to or after welding, for developing a continuous weld and eliminating interface cracks, etc.

Additional objects and advantages of the invention will be apparent from the following description having reference to the accompanying drawings.

DESCRIPTION OF THE DIFFERENT EXAMPLES OF THE INVENTION

Figure 1:
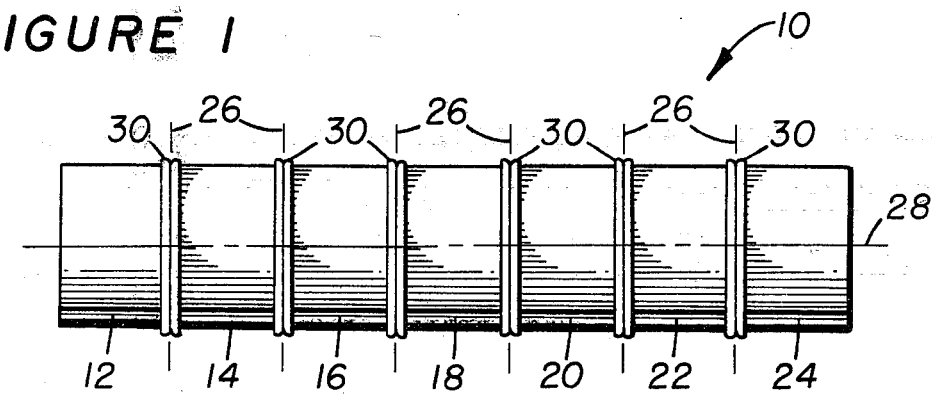
FIG. 1 is a view of a transition joint wherein adjacent transition parts are interconnected by means of friction welding.

Within the drawings, FIG. 1 has been provided in order to clearly illustrate the formation of friction welded bonds between adjacent parts of the transition joint and illustrating the manner in which excess metal, some of which may be molten, is extruded therefrom during upset in order to achieve one important feature of the present invention. That feature, of course, is the relatively unchanged composition of each transition part closely adjacent to the friction welded interface by which it is interconnected to an adjacent part.

Figure 2:
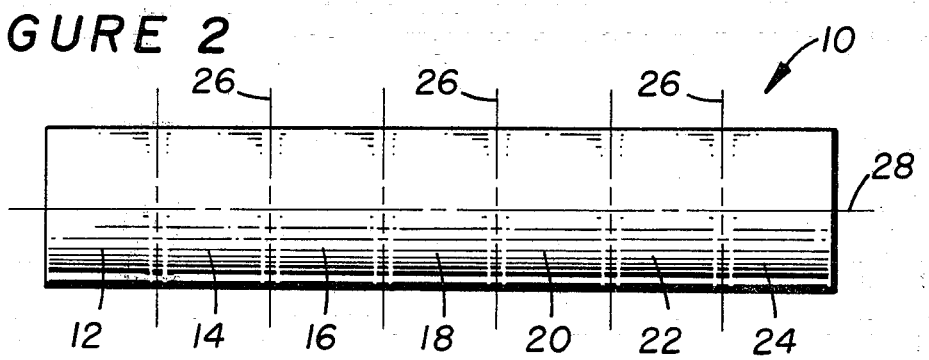
FIG. 2 is a similar view of the friction welded joint of FIG. 1 with excess metal removed from the friction welded joints on both the inside and outside tubular surfaces.
Figure 3:
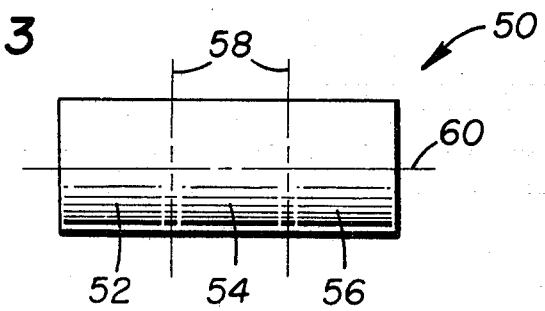
FIG. 3 is a view of another transition joint having a different combination of transition parts interconnected by friction welding and illustrated after removal of excess metal from the friction welded joints.
Figure 4:
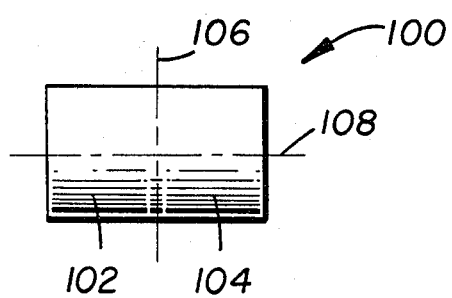
FIG. 4 is a view of a transition joint formed from yet another combination of transition parts joined together by friction welding and shown after removal of excess metal from the friction welded joints.

FIG. 2 illustrates the manner in which excess material formed at each friction welded interface is removed from the transition joint in order to eliminate the presence of stress risers, either thermal or mechanical, along the length of the transition joint. Finally, the location and orientation of each intermediate interface throughout the length of the transition joints in FIGS. 2–4 are illustrated in phantom to show that they are perpendicular to the axis of the respective joint.

Before describing the transition joints of the figures in greater detail, reference is first made to Tables I and II set forth immediately below. Table I demonstrates the materials used in the various parts of the transition joints of FIGS. 1–4. Table II specifically identifies both the nominal chemical composition for each of the transition joint parts as well as other characteristics of each part such as its coefficient of thermal expansion and maximum allowable stress. Returning again to Table I, the identification of the type material used for each part throughout the length of the transition joints is set forth. For each of the joints identified in Table I, it may be seen that the transition part first identified for each example is a low alloy steel which, of course, is inherently suited for welding to tubing of similar composition. The composition of the part last noted for each example is similarly of high temperature alloy composition which also facilitates its welding to a tube of similar composition.

TABLE I

EXAMPLES OF FRICTION WELDED TRANSITION JOINTS

| Corresponding Figure | Range of Material Types |
| --- | --- |
| 1 and 2 | T-22/T-5/T-9/410/600/800H/304H |
|  | (12) (14) (16) (18) (20) (22) (24) |
| 3 | T-22/T-9/304H |
|  | (52) (54) (56) |
| 4 | T-22/800H |
|  | (102) (104) |

TABLE II
TRANSITION JOINT MATERIALS

| TYPE | SPECIFICATION | NOMINAL COMPOSITION (percent by wgt) | MEAN COEFFICIENT OF THERMAL EXPANSION ($\alpha$) TO 1100° F., in/in/°F. | MAX. ALLOWABLE STRESS (ksi) 1050° F. | 1100° F. |
|---|---|---|---|---|---|
| T-22 | SA213 | 2¼ Cr—1 Mo—0.15C | 8.0 | 5.8 | 4.2 |
| T-5 | SA213 | 5 Cr—½ Mo—0.15C | 7.0 | 4.2 | 3.1 |
| T-9 | SA213 | 9 Cr—1 Mo—0.15C | 7.0 | 5.5 | 3.3 |
| 410 | SA268 | 12.5 Cr—0.15C | 6.4 | 4.4 | 2.9 |
| 600 | SB167 | 16 Cr—72 Ni—8Fe—0.15C | 8.4 | 4.5 | 3.0 |
| 800H | SB163 | 21 Cr—32Ni—46Fe—0.6Ti—0.1C | 9.4 | 13.7 | 13.5 |
| 304H | SA213 | 18 Cr—8Ni—0.08C | 10.4 | 12.2 | 9.8 |

Note:
For each of the compositions noted above, the balance is essentially iron if not otherwise identified.

It is to be noted that all of the materials listed in Table II and employed within the transition joints 10, 50 and 100 are standard compositions approved by the ASME (American Society of Mechanical Engineers) boiler and pressure vessel code. Accordingly, these materials may be used within such transition joints with assurance of their durability over long periods of operation under severe conditions. However, it is to be noted that the present invention is not essentially limited to the use of such materials. Other materials such as Type 422 stainless steel (AISI 616) or HT9 (of similar composition) may be substituted or used concurrently. Also, other intermediate alloys, such as carbon steels, alloy steels (Types T-21 and T-7) and stainless steels (Types 409, 429 and 430), may be used.

Referring now to the drawings, the transition joint of FIGS. 1 and 2 is adapted to withstand relatively severe operating conditions. Accordingly, the transition joint 10 of FIGS. 1 and 2 is formed from seven transition parts labeled respectively 12–24. The same numerical labels are also shown within parentheses in Table I. Thus, the composition for the serial arrangement of parts in the transition joint of FIGS. 1 and 2 may be clearly seen by reference to Tables I and II. In that regard, it may be seen that part 12 is a low alloy steel. In fact, part 12 is of a composition similar to that employed within many heat exchangers of the type referred to above. Thus, the part 12 being arranged on one end of the transition joint 10 would particularly facilitate welding of the joint to a long run low alloy steel tube of the type employed in such a heat exchanger.

Similarly, the part 24 at the other end of the transition joint 10 is formed from a high temperature alloy composition of a type which also might be used to withstand the high temperature environment of such a heat exchanger. Therefore, the part 24 would similarly facilitate welding of the transition joint 10 to that material. The intermediate parts 14–22 are selected both as to chemical composition and to other properties, particularly their coefficient of thermal expansion in order to best resist very high temperatures as noted above.

The compositions for the parts 14–22 have preferably been selected in order to limit the maximum differential or variation of chromium content between adjacent parts. In this manner, the transition joint 10 is best able to resist the tendency for carbon migration which commonly occurs when there is a substantial change in chromium content across an interface.

Similarly, the parts 14–22 have also been selected to provide minimum change in the coefficient of thermal expansion between adjacent parts. It may be seen that the greater changes in coefficient of thermal expansion occur for the parts 18–22 which are formed from higher strength materials and have correspondingly higher strength interfaces and are therefore better able to resist disruptive forces caused by the different rates of thermal expansion.

The friction welded interface between each adjacent pair of parts is indicated at 26 and it may be seen that each of the interfaces 26 is perpendicular to longitudinal axis 28 for the transition joint 10. Upset material produced during the formation of each friction weld interface is also indicated at 30 in FIG. 1. Similar upset material is also formed on the inner diameter of the tubular joint 10 and would similarly be removed to form the smooth transition joint illustrated in FIG. 2.

Referring now to FIG. 3, yet another transition joint is indicated at 50 and includes three transition parts 52–56. The respective numerical labels are also included in parentheses in Table I in order to provide an accurate identification of composition for each of the parts. It may be seen that the composition of parts 52, 54 and 56 from the transition joint 50 of FIG. 3 correspond with the parts 12, 16 and 24 in the transition joint 10 of FIGS. 1 and 2. The transition joint 50 of FIG. 3 is thus of simplified construction compared to the transition joint 10. This of course would simplify construction of the transition joint 50 for purposes of economy and the like. At the same time, the transition joint 50 is adapted for less severe operating conditions than the transition joint 10 of FIGS. 1 and 2. This is immediately apparent because of the greater variation in chromium content between adjacent parts and also the greater variation in thermal expansion between adjacent parts for the transition joint 50. However, the use of friction welding for joining together such selected adjacent parts provides better control of composition near the interfaces, develops lower stresses during service from differential thermal expansion, and provides some protection from deleterious metallurgical changes such as carbon migration than direct fusion welding of parts 52 and 56, thus better adapting the joint for withstanding high temperature conditions. The transition joint 50 of FIG. 3 similarly has its adjacent parts bonded together by friction welding at interfaces identified at 58. It may again be seen that each of the interfaces 58 is perpendicular to the longitudinal axis 60 for the transition joint 50. At the same time, the composition of the transition parts at opposite ends of the joint 50 are similarly adapted to facilitate bonding to heat exchanger or boiler parts, preferably by conventional fusion welding.

Turning now to FIG. 4, yet another transition joint is illustrated at 100 and includes only two transition parts 102 and 104 interconnected by a friction weld interface 106 which is perpendicular to the longitudinal axis 108 for the transition joint 100. Thus, it may be seen that the transition joint 100 is similarly formed from a plurality of parts interconnected by friction welding with the composition of parts at opposite ends of the joint being adapted to facilitate welding to low alloy steel tubing and high temperature alloy tubing respectively, preferably by means of conventional fusion welding. In both the transition joints 50 and 100, the interfaces 58 and 106 are illustrated with the upset material already being removed as was similarly described above for the transition joint 10 of FIG. 1. The transition joint 100 of FIG. 4 is, of course, adapted for even less severe operation conditions. However, the transition joint 100 demonstrates that the capability of a transition joint to resist even moderately severe operating conditions is enhanced by the two parts 102 and 104 being interconnected by means of the friction welded interface 106.

Various modifications and additions are, of course, possible within the scope of the present invention which is therefore defined only by the following appended claims.

What is claimed is:

1. A bonded transition joint for use in high temperature applications which must withstand severe conditions in high temperature environments comprising at least three tubular transition parts:
    a first tubular part of low alloy or carbon steel having a first predetermined chromium content with a uniform thermal expansion coefficient, strength and carbon constituency throughout and having a longitudinal extending axis,
    a second tubular part of a higher chromium alloy with a uniform thermal expansion characteristics, strength and carbon constituency throughout and having a longitudinally extending axis aligned with the longitudinally extending axis of said first tubular part;
    a third tubular part of a high temperature alloy and having a higher chromium content than said predetermined chromium content,
    a first interface on the end of said first tubular part in a plane perpendicular to the axis of said first tubular part and having a cross-sectional thickness equal to the thickness of said first tubular part,
    a second interface on the end of said second tubular part in a plane perpendicular to the axis of said second tubular part and having a cross-sectional thickness equal to the thickness of said second tubular part,
    at least a portion of the transition parts within the transition joint being formed from standard, code approved materials to assure effective operation over long periods of time,
    said first and second interfaces being abutted and bonded to each other by friction welding without any weld material between said interfaces to limit mixing of compositions of said first and second materials, to limit the migration of carbon from the first tubular part to the second tubular part, and to reduce thermally induced stresses,
    said third tubular part being friction welded to another end of said second tubular part.

2. The transition joint of claim 1 wherein the transition parts at opposite ends of the transition joint are formed from similar materials as the low alloy or carbon steel and high temperature alloy pieces to which they are to be connected.

3. The transition joint of claim 1 wherein the number of transition parts included within the transition joint are selected in proportion to the severity of operating conditions to be encountered by the transition joint in operation.

* * * * *